US008527301B2

(12) United States Patent
McComb et al.

(10) Patent No.: US 8,527,301 B2
(45) Date of Patent: Sep. 3, 2013

(54) SYSTEM AND METHOD FOR EVALUATING RISK ASSOCIATED WITH A CROP INSURANCE POLICY

(75) Inventors: Shawn James McComb, Algonquin, IL (US); Dermot James Hayes, Ames, IA (US); Bruce Alan Babcock, Ames, IA (US)

(73) Assignee: Deere & Company, Moline, IL (US)

( * ) Notice: Subject to any disclaimer, the term of this patent is extended or adjusted under 35 U.S.C. 154(b) by 1843 days.

(21) Appl. No.: 11/389,685

(22) Filed: Mar. 27, 2006

(65) Prior Publication Data

US 2007/0174095 A1 Jul. 26, 2007

Related U.S. Application Data

(60) Provisional application No. 60/760,848, filed on Jan. 20, 2006.

(51) Int. Cl.
*G06Q 40/00* (2012.01)
(52) U.S. Cl.
USPC .......................................................... 705/4
(58) Field of Classification Search
USPC .......................................................... 705/4
See application file for complete search history.

(56) References Cited

U.S. PATENT DOCUMENTS

| 5,884,224 | A | * | 3/1999 | McNabb et al. | 702/2 |
|---|---|---|---|---|---|
| 5,897,619 | A | | 4/1999 | Hargrove, Jr. et al. | 705/4 |
| 2002/0173980 | A1 | * | 11/2002 | Daggett et al. | 705/1 |
| 2003/0061075 | A1 | * | 3/2003 | Heckman et al. | 705/4 |
| 2005/0027572 | A1 | | 2/2005 | Goshert | 705/4 |

OTHER PUBLICATIONS

United States Department of Agriculture. Noninsured Crop Disaster Assistance Program (NAP), 2001 (brochure).
Breustedt, G. Area Yield Insurance for Multiple-Crop Farmers in Europe [online]. [Retrieved on Jun. 2, 2005]. Retrieved from the Internet: <URL: http://ww.uni-kiel.de/marktlehre/payes/area_yield_insurance.pdf>.
United States Department of Agriculture Risk Management Agency. Introduction to Risk Management, Understanding Agricultural Risks: Production, Marketing, Financial, Legal, Human Resources [online]. Revised Dec. 1997. [Retrieved on Jun. 2, 2005]. Retrieved from the Internet: <URL: http://www.ffa.org/programs/riskmgt/documents/rme_introbooklet.pdf>.
Wikipedia. Capital asset pricing model. [online]. Jun. 25, 2009. [retrieved on Jul. 9, 2009-] Retrieved from the Internet: <URL:http://en.wikipedia.org/wiki/Capital_asset_pricing_model>.
Sharpe, W. F. Capital Asset Prices: A Theory of Market Equilibrium under Conditions of Risk. The Journal of Finance. vol. 19, No. 3. (Sep. 1964), pp. 425-442.

* cited by examiner

*Primary Examiner* — Greg Pollock (57) ABSTRACT

A system and method for evaluating the risk of insuring a grower comprises a communications interface for obtaining a geographic area yield (e.g., mean geographic area yield) of a crop for a particular geographic area (e.g., county) for a corresponding time period. A yield monitor or a yield sensor, associated with a ground-based or aerial work vehicle, obtains a benchmark grower yield (e.g., historic grower yield) for a particular grower within the particular geographic area. An analyzer determines a difference between the geographic area yield and the benchmark grower yield (e.g., historic grower yield). An estimator estimates a variability parameter indicative of a variation in forecasted grower yield in the geographic area. A data processor determines a forecasted grower yield, which may deviate from at least one of the geographic area yield (e.g., mean geographic area yield) and the benchmark grower yield, for the corresponding time period based on the difference and the variability parameter. A data processor determines a risk indicator based on the determined forecasted grower yield.

16 Claims, 7 Drawing Sheets

SYSTEM AND METHOD FOR EVALUATING RISK ASSOCIATED WITH A CROP INSURANCE POLICY

This document (including all drawings) claims priority based on U.S. provisional application Ser. No. 60/760,848, filed Jan. 20, 2006, and entitled SYSTEM AND METHOD FOR EVALUATING RISK ASSOCIATED WITH A CROP INSURANCE POLICY, under 35 U.S.C. 119(e).

FIELD OF THE INVENTION

This invention relates to a system and method for evaluating risk associated with a crop insurance policy.

BACKGROUND OF THE INVENTION

Farmers use group crop insurance to manage various risks associated with growing crops. Such risks include loss caused by weather, hail, drought, frost damage, insects, or disease, for instance. Certain group crop insurance policies only pay in the event that a loss reduces an average yield or average revenue of a particular geographic area (e.g., a county), as opposed to the loss of yield or revenue of an individual grower. Individualized crop insurance policies protect against a particular grower's risk of growing crops. Hybrid crop insurance policies are crop protection schemes that may provide a combination of protection against individualized risk and group risk. There is a need for an insurer (or reinsurer) to estimate the risk associated with various types of crop insurance policies, and hence, the premiums or rates corresponding to the level of risk assumed.

SUMMARY OF THE INVENTION

A system and method for evaluating the risk of insuring a grower comprises a communications interface for obtaining a geographic area yield (e.g., mean geographic area yield) of a crop for a particular geographic area (e.g., county) for a corresponding time period. A yield sensor, associated with a ground-based or aerial work vehicle, facilitates obtaining a benchmark grower yield (e.g., historic grower yield) for a particular grower within the particular geographic area. An analyzer determines a difference between the geographic area yield and the benchmark grower yield (e.g., historic grower yield). An estimator estimates a variability parameter indicative of a variation in forecasted grower yield in the geographic area. A data processor determines a forecasted grower yield, which may deviate from at least one of the geographic area yield (e.g., mean geographic area yield) and the benchmark grower yield for the corresponding time period, based on the difference and the variability parameter. A data processor determines a risk indicator based on the determined forecasted grower yield.

DESCRIPTION OF THE PREFERRED EMBODIMENT

Figure 1:
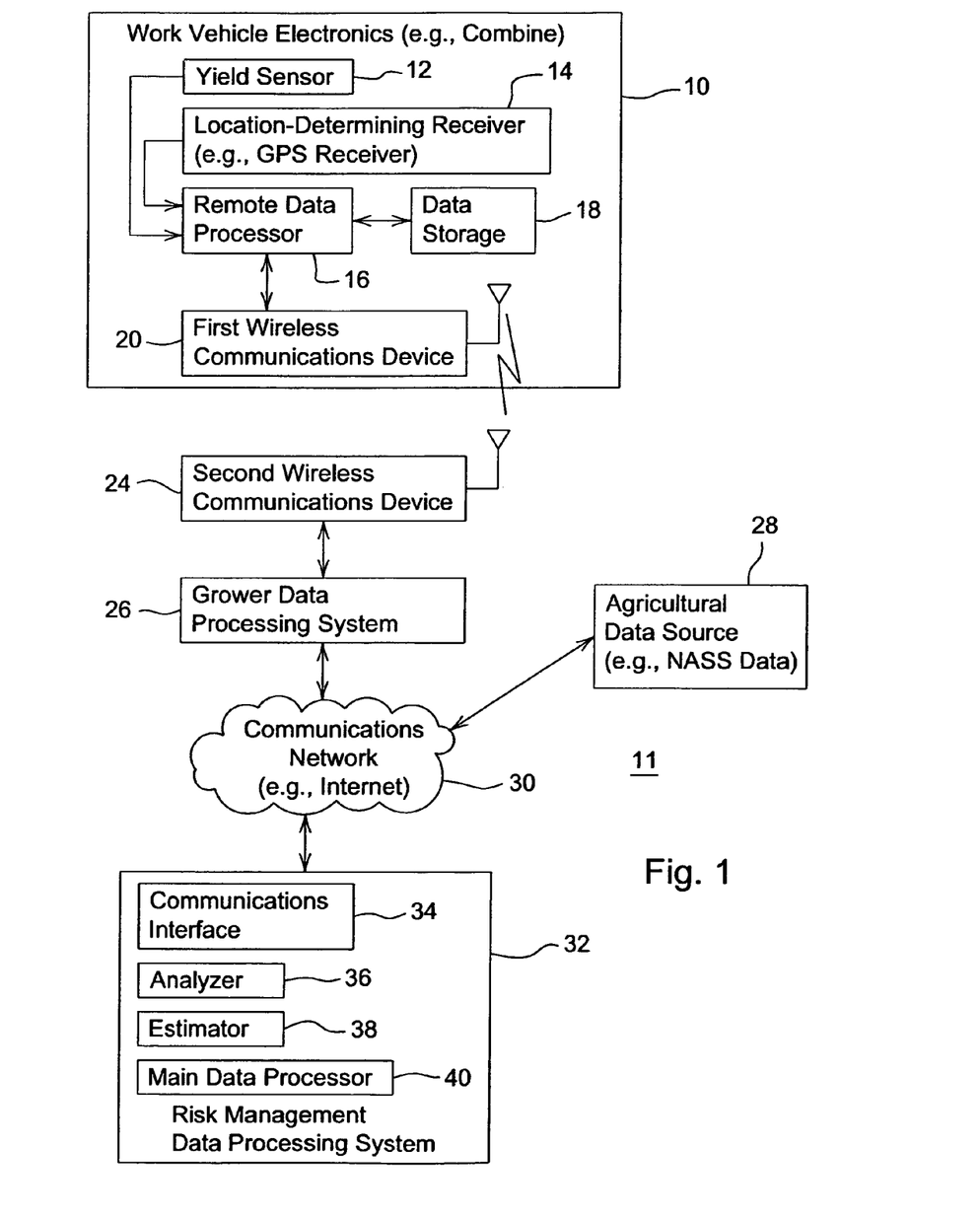
FIG. 1 is a block diagram of one embodiment of a system for evaluating the risk of insuring a grower.

In accordance with FIG. 1, the system 11 for evaluating the risk of insuring a grower with crop insurance comprises work vehicle electronics 10 that communicate with a risk management data processing system 32 via a communications network 30. The work vehicle electronics 10 comprises a yield sensor 12 and a location-determining receiver 14 coupled to a remote data processor 16. In the work vehicle electronics 10, the remote data processor 16 communicates with a data storage 18 device and a first wireless communications device 20.

The first wireless communications device 20 of the vehicle electronics communicates with a second wireless communications device 24 via an electromagnetic signal (e.g., a radio frequency signal). In one embodiment, the second wireless communications device 24 is coupled to a grower data processing system 26 or a gateway interface to the communications network. The grower data processing system 26 or gateway interface may communicate with the risk management data processing system 32 via a communications network 30 (e.g., the Internet). For example, the grower data processing system 26 may transmit yield data and corresponding location data, benchmark grower yield data, or other grower performance data, collected by the work vehicle electronics 10.

The risk management data processing system 32 comprises a communications interface 34, an analyzer 36, an estimator 38, and a main data processor 40. The communications interface 34 supports communications with the grower data processing system 26, an agricultural data source 28, or both. The agricultural data source 28 may comprise a source of geographic area yield data, county yield data, mean geographic area yield data, mean county yield data, or other benchmark agricultural performance data. Benchmark agricultural performance data may be available through NASS (National Agricultural Statistics Service), the U.S. Department of Agriculture, the Risk Management Agency, or another governmental, university, or commercial data provider.

The yield sensor 12 may be mounted on a ground-based vehicle (e.g., a combine) or on an aerial vehicle (e.g., an aircraft). For a ground-based vehicle, the yield sensor 12 may comprise one or more of the following: crop flow sensor, a crop moisture sensor, a ground speed sensor, an impact sensor, a displacement sensor, a radiometric crop flow measuring system, and a photosensor grain yield monitor. An impact sensor may comprise a strain gauge or piezo-electric device mounted to an impact member (e.g., plate) in the path of discharged, harvested crop (e.g., grain), where the force of the moving crop is typically measured by the degree of compression of the strain gauge or piezo-electric device. A displacement sensor may comprise a potentiometer mounted to an impact member (e.g., plate) in the path of the discharged, harvested crop (e.g., grain) where the force of the moving, harvested crop is measured by a change in resistance of the potentiometer from displacement of the impact member. The photosensor grain yield monitor estimates grain volume flow rates by measuring changes in the received amplitude or received waveform of a light source or electromagnetic source placed between the discharged crop and the photodetector.

For an aerial vehicle, the yield sensor 12 may comprise (a) camera or imaging system that is capable of collecting images in one or more of the following frequency spectrums: visible light, infra-red light, near-infra-red light, and ultraviolet light, (b) a location-determining receiver 14 (e.g., Global Positioning Receiver system with differential correction) for determining the position of the imaging system, (c) an inertial measurement unit for determining a three dimensional attitude (e.g., roll, tilt, and yaw) of the imaging system, and (d) a data processor for determining crop yield by analyzing collected image data by application of ground-referenced or location-referenced NDVI (normalized difference vegetation index) readings or another visual indicator of crop vigor or health. The NDVI is defined as the following ratio: (near infra-red frequency band intensity−red band intensity)/(near infra-red frequency band intensity+red frequency band intensity).

Figure 2:
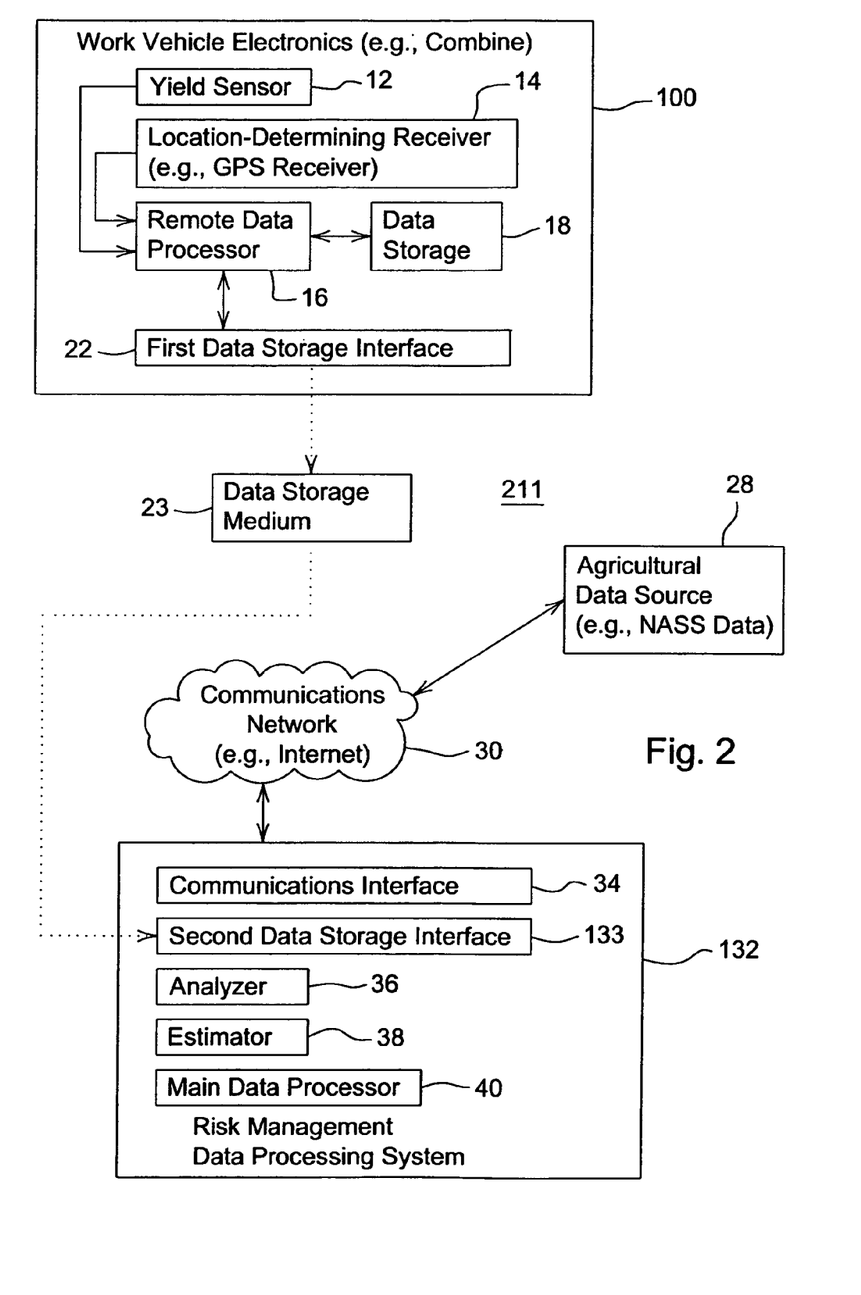
FIG. 2 is a block diagram of another embodiment of a system for evaluating the risk of insuring a grower.

The system 211 of FIG. 2, for evaluating the risk associated with a crop insurance policy, is similar to the system 11 of FIG. 1, except the first wireless communications device 20, the second wireless communications device 24, and the grower data processing system 26 are deleted from the system of FIG. 2, and the data storage interfaces (22, 133) and data storage medium 23 are added to the system 211 of FIG. 2.

In FIG. 2, the work vehicle electronics 100 includes a first data storage interface 22 for writing grower performance data, benchmark grower yield data, or other data to a data storage medium 23. The data storage medium 23 may comprise an optical disk, a writable optical disk, a magnetic disk, a memory card, Flash or non-volatile memory, a floppy disk, a magnetic tape, or another suitable storage medium for storing data. The first data storage interface 22 records on or writes to the data storage medium 23.

The user or grower may remove the recorded data storage medium 23 and send or otherwise transmit it, or the data thereon, to a risk management data processing system 132. Although the data on the recorded data storage medium 23 may be electronically transmitted via any communications device equipped with a data storage 18 interface and access to the communications network 30, the user may mail, ship, or otherwise transport the data storage medium 23 to the location of the risk management data processing system 132, where a user reads or inputs the data storage medium 23. At the risk management data processing system 132, the second data storage interface 133 reads, recovers, copies or interprets the grower performance data or other data present on the data storage medium 23. The configuration of FIG. 2 may be used where the grower does not have wireless communication devices or a grower data processing system 26, for example.

In an alternative embodiment to that of FIG. 2, the first data storage interface 22 of the work vehicle electronics 100 and the second data storage interface 133 of the risk management data processing system 132 may be added to the system of FIG. 1 for redundancy, or added reliability. For example, the data storage interfaces (22, 133) may provide an alternative or back-up transfer of data in the event that wireless communications between the wireless communication devices is unreliable or impaired.

Figure 3:
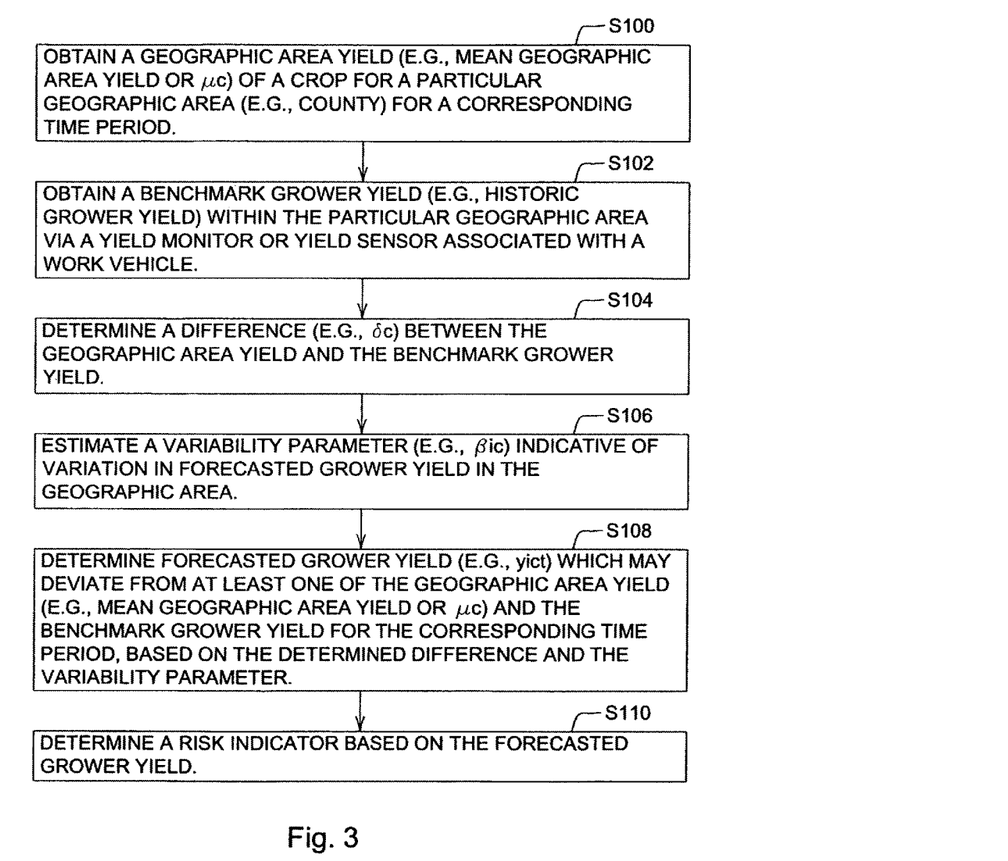
FIG. 3 is a flow chart of a first embodiment of a method for evaluating the risk of insuring a grower.

FIG. 3 shows a method for evaluating the risk of insuring a grower with crop insurance. The method of FIG. 3 starts with step S100.

In step S100, a risk management data processing system (32 or 132) or communications interface 34 obtains a geographic area yield (e.g., mean geographic yield or $\mu_c$) of a crop for a particular geographic area (e.g., a county or region) for a corresponding time period. For example, the risk management data processing system (32 or 132) or communications interface 34 obtains a historic mean geographic yield or an estimated mean geographic yield derived from the historic mean geographic yield. The risk management data processing system (32 or 132) may obtain the geographic area yield of a crop via one or more of the following data sources: (a) yield measurements of one or more yield sensors 12 (e.g., from multiple growers within a geographic area), (b) collected image data collected by an aerial imaging system, and (c) an agricultural data source (e.g., NASS data provider, the U.S. Department of Agriculture, the Risk Management Agency, or another governmental, university, or commercial data provider). The yield measurements of one or more yield sensors 12 associated with ground-based work vehicles (e.g., combines or harvesters) may be used to ground-truth or for relative comparison to yield data estimated through collected image data.

In step S102, a risk management data processing system (32 or 132) or a communications interface 34 obtains a benchmark grower yield (e.g., historic grower yield) for a particular grower within the particular region via a yield monitor or yield sensor 12 associated with an aerial or ground-based work vehicle. For example, the risk management data processing system 32 or a communications interface 34 obtains a historic grower yield or an estimated grower yield derived from the historic grower yield for one or more previous growing seasons. Although the benchmark grower yield (e.g., historic benchmark grower yield) may pertain to substantially the same time period as the mean geographic area yield (e.g., historic mean geographic area yield), the time periods may be overlapping, discontinuous, and/or of different durations. Step S100 and S102 may be executed in any order, or simultaneously, and may be executed in the reverse order shown in FIG. 3, while still falling within the scope of an embodiment of the invention.

In step S104, a risk management data processing system (32 or 132) or an analyzer 36 determines a difference (e.g., $\delta_{ic}$) between the geographic area yield and benchmark grower yield. For example, the difference may be expressed as a normalized geographic area yield per land unit basis (e.g., yield per acre or bushels per acre basis) and a normalized benchmark grower yield that is normalized to a yield per land unit basis. The difference may result from one or more of the following agronomic factors: a particular grower's management practices (e.g., no-till, low-till, planting time, selection or application of crop inputs), the environment of a particular grower (e.g., rainfall, temperature, soil characteristics, drought, disease stress), or the genetic characteristics of the particular crop (e.g., genetic makeup or hybridization of seed or plants), among other things.

In step S106, a risk management data processing system (32 or 132) or an estimator 38 estimates a variability parameter (e.g., $\beta_{ic}$ or another beta) indicative of variation in at least one of the geographic area yield (e.g., the mean geographic area yield) and the benchmark grower yield. The variability parameter may consider the variability of the benchmark grower yield, the geographic area yield or both with respect to systematic shocks or problems that tend to materially impact a geographic area (e.g., a county) of interest or multiple growers in the geographic area. Different geographic areas may be associated with respective different values of variability parameters. For example, the values of variability parameters may vary within a geographic zone within a region or based on the genetics, environment, and management associated with a crop within a geographic zone.

In one example, if the variability parameter substantially equals one, then the unit-level variance of a growing unit (e.g., an individual grower) generally equals the variance of the systemic risk plus the variance of poolable risk. A growing unit may comprise one or more insurable units. The insurable units may be referenced by a field identifier, a geographic identifier, geographic coordinates of the boundaries of a field, or otherwise. In another example, if the variability parameter approximately equals zero, then the unit-level variance of a growing unit yields just equals the variance of poolable risk. In yet another example, if variability parameter equals two, then the variance of farm yield equals four times the variance of systemic risk plus the variance of poolable risk.

In step S108, a risk management data processing system (32 or 132) or a main data processor 40 determines an estimated grower yield based on the determined difference and variability parameter. In accordance with one technique for carrying out step S108, the estimated grower yield may be based on the following model or equation:

$$y_{ict} = \mu_c + \delta_{ic} + \beta_{ic}(y_{ct} - \mu_c) + \epsilon_{ict} = \alpha_{ic} + \beta_{ic} y_{ct} + \epsilon_{ict}, \quad (1)$$

where $y_{ict}$ is the estimated grower yield for a particular grower or insurable unit in a geographic area for region c and field i, $\mu_c$ is the average or mean geographic area yield (e.g., mean county yield), $\delta_{ic}$ is the difference between the mean geographic area yield and grower mean yield (e.g., grower benchmark yield), $y_{ct}$ is the county yield in time period t, and $\epsilon_{ict}$ is the error term for field i deviation in geographic area c, time period t, $\alpha_{ic} = \delta_{ic} + (1 - \beta_{ic})\mu_c$, and $\beta_{ic}$ is the variability parameter or beta. In one embodiment, the above parameters of the equation may be estimated based on National Agricultural Statistics Service (NASS) county yield data combined with Risk Management Agency (RMA) data, or other available data sources that provide yields on the grower or the associated insurable unit of the grower.

In step S110, the main data processor 40 determines a risk indicator based on the estimated grower yield (e.g., $y_{ict}$). Step S110 may be executed in accordance with various techniques, which may be applied individually or cumulatively.

Under a first technique, the main data processor 40 determines deviation of the estimated grower yield (e.g., $y_{ict}$) from at least one of the mean geographic area yield (e.g., $\mu_c$) and a benchmark grower yield for the corresponding time period and geographic area based on the determined difference and variability parameter. The benchmark grower yield may be based on the obtained grower yield of step S102 or a historic grower yield. In general, the larger the negative deviation from the estimated grower yield, the greater the risk (e.g., risk indicator) of the particular grower. Conversely, the lower the negative deviation from the estimated grower yield, the lesser the risk (e.g., risk indicator) of the particular grower.

In accordance with a second technique for carrying out step S110, the risk indicator comprises a risk error term (e.g., poolable risk error). If there is adequate historical data (e.g., at least five years of data) for a particular grower or insured unit and for its applicable geographic area (e.g., county), the risk error term may be estimated from the following equation:

$$\hat{\epsilon}_{ict} = y_{ict} - \hat{\alpha}_{ic} - \hat{\beta}_{ic} y_{ct} \quad (2)$$

where $\hat{\epsilon}_{it}$ is a risk indicator (e.g., of the poolable risk), $\hat{\alpha}_{ic} = \hat{\delta}_{ic} + (1 - \hat{\beta}_{ic})\hat{\mu}_c$, $\hat{\beta}_{ic}$ is the variability of a field i within geographic area c, and $y_{ct}$ is the county yield in time period t. In the foregoing equation, a hat symbol over a variable or parameter denotes that it may be estimated with regression analysis or derived through other mathematical or statistical techniques. Here, $\epsilon_{it}$ is an indicator of the poolable risk that is generally not correlated with multiple geographic areas. If one can estimate the betas ($\beta_{ic}$) for each insurable unit in a geographic area (e.g., county), the equation (2) yields a corresponding measure of how much poolable risk there is at the insurable unit.

In accordance with a third technique for carrying out step S110, which may be use alone or in combination with the second technique, the risk indicator comprises a variance of poolable risk associated with each insurable units (e.g., from insurable unit j=1 to j=N.) The variance ($\hat{\sigma}_{\epsilon,c}^2$) of poolable risk or collective risk for all of the insurable units with a particular geographic area (e.g., county) may be estimated by the following equation:

$$\hat{\sigma}_{\epsilon,c}^2 = \frac{1}{\sum_{j=1}^{N_c} T_j} \sum_{j=1}^{N_c} \sum_{t=1}^{T_j} \hat{\epsilon}_{jct}^2 \quad (3)$$

where $T_j$ is the number of years of observations for a particular grower or insurable unit j, and where $\hat{\epsilon}_{jct}^2$ is an indicator of the risk for the particular insurable unit j, in geographic area c, and at time (e.g., growing season) t. The foregoing equation 3 may be regarded as average squared poolable risk in the geographic area (e.g., county). For each insurable unit, the equation provides a means of simulating or modeling temporal variability for the performance of growers or insurable units.

Figure 4:
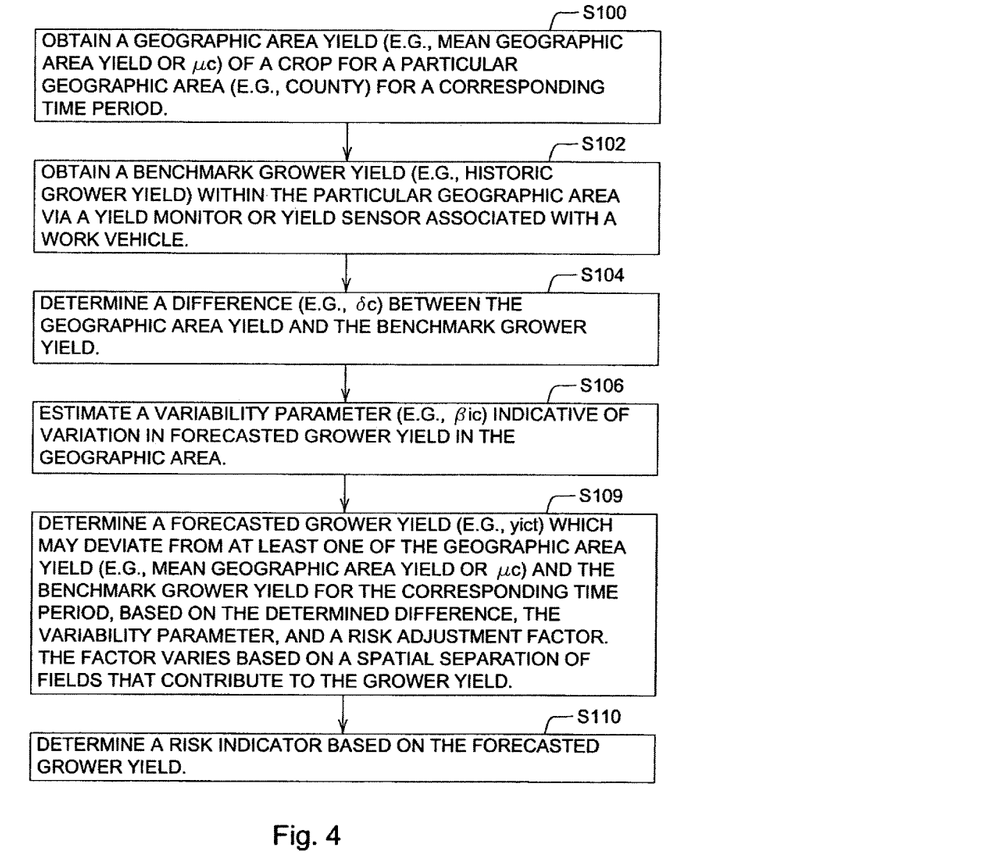
FIG. 4 is a flow chart a second embodiment of a method for evaluating the risk of insuring a grower.

The method of FIG. 4 is similar to the method of FIG. 3, except the method of FIG. 4 replaces step S108 with step S109. Like references in FIG. 3 and FIG. 4 indicate like steps or procedures.

In step S109, a risk management data processing system (32 or 132) or a main data processor 40 determines forecasted grower yield, which may deviate from at least one of the mean region yield and the benchmark grower yield for the corresponding time period, based on the determined difference, the variability parameter, and a risk adjustment factor. The risk adjustment factor is based on a spatial separation of grower fields that contribute to the grower yield or a reduction in variance or variability of the grower yield. If the fields are sufficiently separated where different environmental factors (e.g., weather, climate, and soil characteristics) apply or if the separation distance between different insurable units (e.g., fields) meets or exceeds a minimum separation distance (e.g., 10 Kilometers), the risk of insuring that grower with crop insurance based on a yield performance or revenue performance may decrease. The minimum separation distance may be determined through empirical analysis, field studies, or otherwise. The grower may be defined as an enterprise unit comprising one or more insurable units (e.g., fields). Each insurable unit may be characterized by a corresponding beta (e.g., a unique beta), a growing zone indicator, or another indicator of relative risk.

Figure 5:
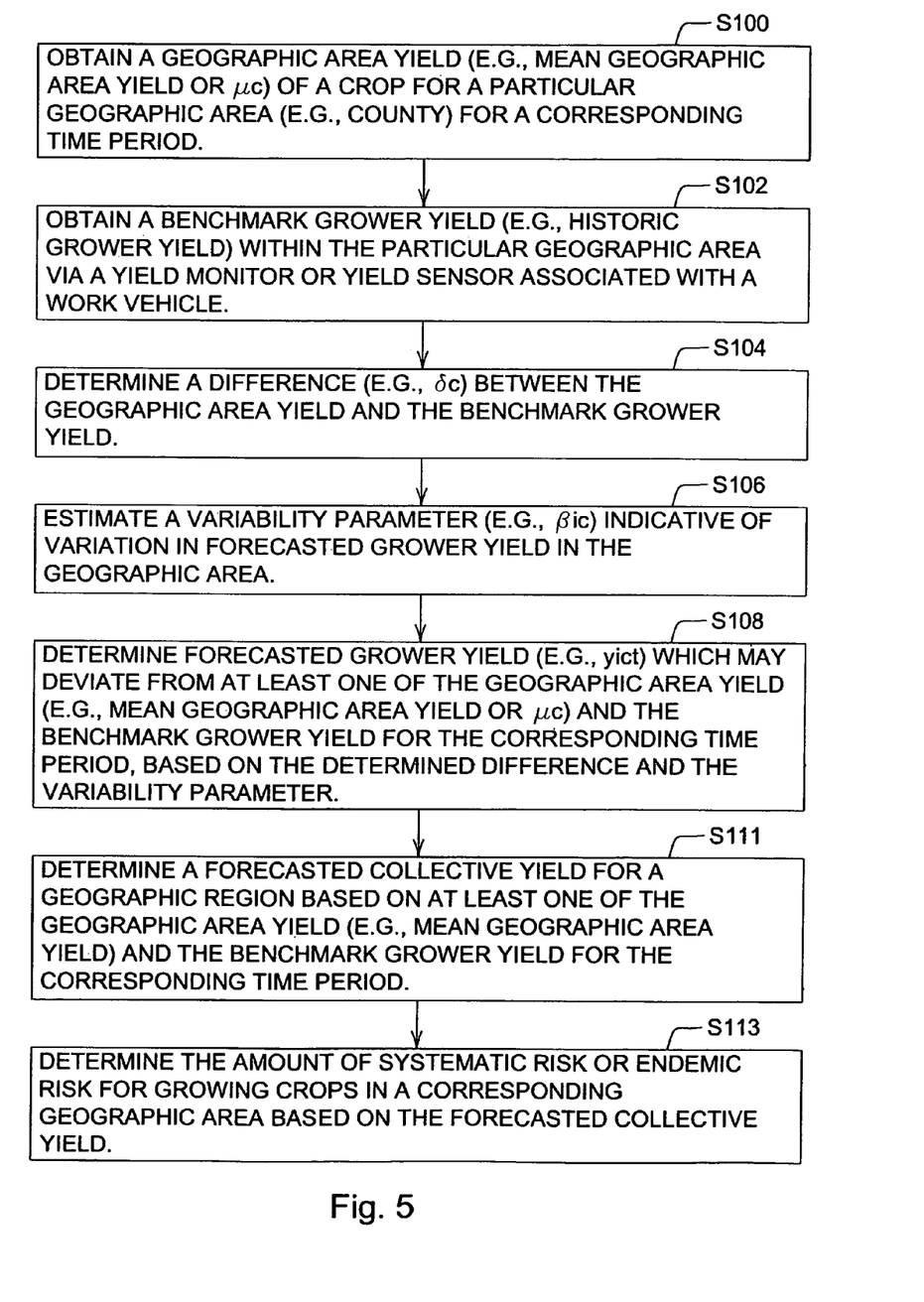
FIG. 5 is a flow chart of a third embodiment of a method for evaluating the risk of insuring a grower.

The method of FIG. 5 addresses risk of a particular geographic area as to opposed to the risk of a particular grower as set forth in FIG. 3. Like reference numbers in FIG. 3 and FIG. 5 indicate like steps or procedures.

The method of FIG. 5 replaces step S110 of FIG. 3 with step S111; step S111 is followed by step S113.

In step S111, the risk management data processing system (32 or 132) may determine a forecasted collective yield for a geographic region based on at least one of the geographic area yield (e.g., mean geographic area yield) and the benchmark grower yield for the corresponding time period. For example, the risk management data processing system (32 or 132) may determine the collective yield for a geographic region based on the following equation:

$$y_{ictd} = \hat{\alpha}_{ic} + \hat{\beta}_{ic} y_{ct}^{adj} + e_{ictd}, \quad (4)$$

where $y_{ct}^{adj}$ are geographic area yields adjusted for yield improvements by technological advances, $e_{ictd}$ are draws from a normal distribution with mean zero and variance $\hat{\sigma}_{\epsilon,c}^2$ on insurance-unit i, and t=1 ... N, d=1 ... M. A draw is one unit of a random sample that follows a specified distribution, such as a normal distribution with mean zero and variance. For each growing unit, there may be P yield draws (where P is equal to the product of t and d) and M of poolable risk draws (d) for each year of county yields. Thus, the longer time series of geographic area yields may be used to estimate of the amount of poolable risk. Note that the above equation (4) takes the farm's beta into account.

In step S113, the risk management data processing system 32 determines the amount of systematic risk or endemic risk for growing crops a corresponding geographic area based on the forecasted collective yield of step S111. The systematic or endemic risk may be adjusted to consider risk current technology or best practices (where applicable) used in crop production.

The systematic risk may be indicated by the total amount of variability for each insurance unit in the data set in accordance with the following equation:

$$\text{Var}(y_{ic}) = \beta_{ic}^2 \text{Var}(y_c^{adj}) + \hat{\sigma}_{\epsilon,c}^2 \quad (5)$$

Note the role of beta in this variance. If beta equals one, then the unit-level variance equals the variance of the systemic risk plus the variance of poolable risk. If beta equals zero, then the variance of insurable unit yield just equals the variance of poolable risk. And if beta equals two, then the variance of farm yield equals four times the variance of systemic risk plus the variance of poolable risk.

The values of betas in a geographic area may be related to or correlated to defined growing zones in a geographic area. There may be a relationship between poolable risk in a county and a defined growing zone (e.g., defined based on environment, soil characteristics, weather, and climate).

Figure 6:
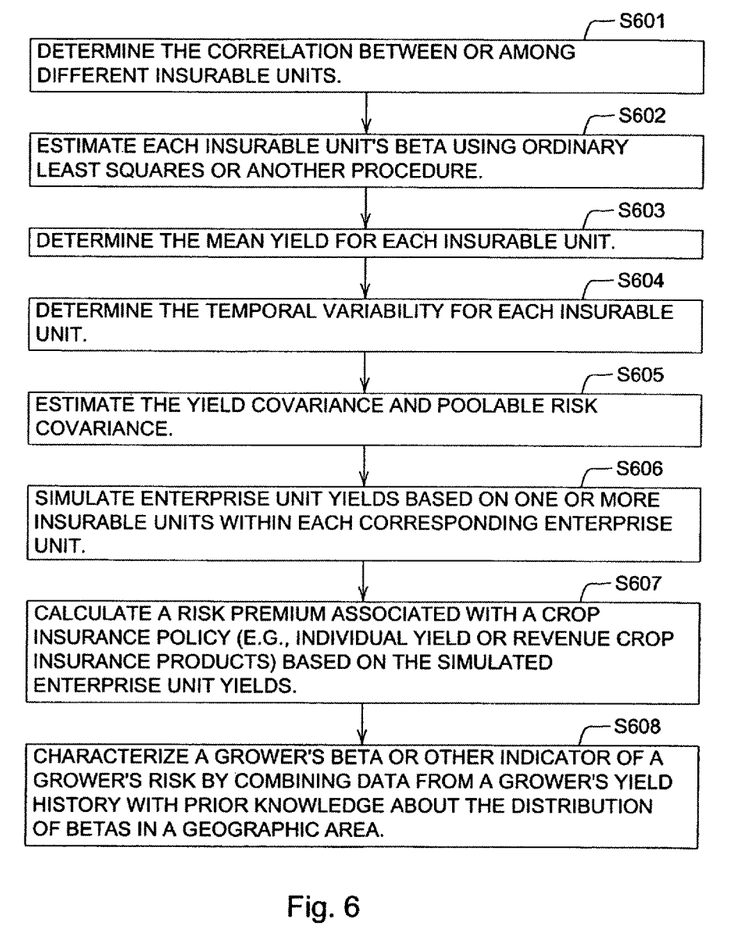
FIG. 6 is a flow chart of a fourth embodiment of a method for evaluating the risk of insuring a grower.

The method of FIG. 6 addresses risk of a particular enterprise that is geographically dispersed, as to opposed to the risk of a particular grower as set forth in FIG. 3. FIG. 6 inherently incorporates a risk adjustment factor associated with geographic separation between insurable units in determining the yield for an insurable unit, or enterprise comprising one or more insurable units. The method of FIG. 3 starts with step S601. Like reference numbers in FIG. 3 and FIG. 6 indicate like steps or procedures.

In step S601, the correlation is determined between or among different insurable units. A lower correlation between insurable units implies greater diversification and lower risk. A higher correlation between insurable units means less diversification.

In one example, the following basic yield equation (6) may be used to determine the covariance between two insurable units i and j:

$$\text{Cov}(y_{it}, y_{jt}) = E(\beta_i(Y_{ct} - \mu_c) + \epsilon_{it})(\beta_j(Y_{ct} - \mu_c) + \epsilon_{jt}) = \beta_j \beta_i \sigma_c^2 + \text{Cov}(\epsilon_{it}, \epsilon_{jt}) \quad (6)$$

Thus, the covariance is simply equal to the product of the betas $(\beta_i, \beta_j)$ times the geographic area variance (e.g., county variance) plus the covariance in poolable risk. The covariance of poolable risk is likely caused by a number of factors and it likely varies across geographic areas (e.g., counties). The covariance generally depends on or is a function of the distance between the insurable units.

In another example, the above covariance may be graphically expressed by reference to the following equation:

$$E(\varepsilon_{it} - \varepsilon_{jt})^2 = \quad (6)$$
$$2\sigma_{\varepsilon,c}^2 - 2\text{Cov}(\varepsilon_{it}, \varepsilon_{jt}) \text{ or } \frac{1}{2}E(\varepsilon_{it} - \varepsilon_{jt})^2 = \sigma_{\varepsilon,c}^2 - \text{Cov}(\varepsilon_{it}, \varepsilon_{jt})$$

In step S601, the left-hand side of this equation may be graphically expressed as a semivariogram. Commercially available, off-the-shelf spatial statistics software may be used to produce a semivariogram graph that shows the expected squared difference in poolable risk between two insurable units (e.g., fields) varies with the distance between the two insurable units (e.g., fields).

In step S602, each insurable unit's beta is estimated using ordinary least squares or another procedure. The insurable unit beta may correspond to the beta of a certain identifiable or defined field. Least squares refers a mathematical procedure for that finding a "best fit" to a set of data by minimizing a sum of the squares of the ordinate differences (called residuals) between the fitted function (e.g., quadratic equation, line equation, or curve) and the actual data.

In step S603, the mean yield for each insurable unit is determined. For example, the mean yield may be determined by applying the following equation (7):

$$E(y_i) = \frac{1}{10}\left(\sum_{t=1}^{10} \hat{\alpha}_{ic} + \hat{\beta}_{ic} y_{ct}^{adj}\right) \quad (7)$$
$$= \hat{\alpha}_{ic} + \hat{\beta}_{ic} \frac{1}{10}\sum_{t=1}^{10} y_{ct}^{adj};$$
$$i = 1, 2;$$

wherein the 10 in the above equation may be more generally expressed a Q years of yield history for an insurable unit or farmer. Note that equation (7) "modernizes" a farmer's yields by taking into account increases in trend yields from technological advancements related to genetic enhancements to seeds, genetic plant enhancements, growing practices, management practices, or otherwise.

In step S604, the temporal variability for each insurable unit is determined. For example, the temporal variability for each insurable units is determined by applying the following equation:

$$\text{Var}(y_{ic}) = \hat{\beta}_i^2 \hat{\sigma}_c^2 + \hat{\sigma}_{\epsilon,c}^2; i=1,2. \quad (8)$$

Taking the square root of this variance gives us the standard deviation of farm yields, which can be divided by the expected unit yield to give us the coefficient of variation of yields at the unit level.

In step S605, the yield covariance and poolable risk covariance are estimated. The yield covariance is simply equal to $\beta_j \beta_i \sigma_c^2$. To determine the yield covariance and poolable risk covariance, a Monte Carlo simulation technique or another statistical tool may be applied.

For the Monte Carlo model, first two sets of poolable risk draws (the $e_{ict}$'s) that are correlated to the correct degree according to how much correlation is indicated by the estimated semivariogram for the given separation distance between the two insurance units within a particular geographic area. Second, we take the first county yield draw, and calculate the systemic components of yields for each unit:

$$y_{itc}^{sys} = \hat{\alpha}_{ic} + \hat{\beta}_{ic} y_{ct}^{adj} \quad i=1,2 \qquad (9)$$

Third, we construct a third set of unit-level yield draws for each unit by adding a fixed number d (e.g., d=500, here) of correlated pairs of poolable risk draws:

$$y_{itcd} = y_{itc}^{sys} + e_{itcd} \quad i=1,2; d=1,\ldots,500. \qquad (10)$$

Fourth, the above process is repeated for each geographic area yield draw for one or more years of available yield data (e.g., NASS county yields). When the above process is finished, we have a resultant set of correlated yield draws. The correlations come about according to each insurance unit's beta and the distance between the insurable units, which affect the amount of correlation in the poolable risk.

In step S606, enterprise unit yields are simulated based on one or more insurable units within each corresponding enterprise unit. The resultant draws of enterprise unit yields represent the weighted average yield as set forth in the following equation:

$$y_{tcd}^{ent} = \frac{\sum_{j=1}^{2} A_j y_{jtcd}}{\sum_{j=1}^{2} A_j} \quad t=1,\ldots,49; d=1,\ldots,500. \qquad (11)$$

where $y_{tcd}^{ent}$ is the enterprise unit yield, $A_i$; i=1,2 is the acreage or land area for each insurance unit, and $y_{itcd}$ is the unit level yield draw. A farmer that wants to plant corn on different fields will simply follow the same procedure, but the enterprise unit yield will simply be the weighted average of the yields on the different fields.

In step S607, the simulated enterprise unit yields are used to calculate a risk premium (e.g., pure risk premium) associated with a crop insurance policy (e.g., for individual yield or revenue-based crop insurance products). This rating procedure accounts for the fact the Euclidean distance affects the correlation between two insurable units' poolable risk; the amount of concentration that exists among a farmer's insurable units; and each field's "beta," which determines both the degree to which systemic risk affects an insurance unit's yield as well as the total covariance between insurable units' yields.

First we explore how a farmer's beta influences a rate. As discussed before and shown in equation (5), increasing a farmer's beta while holding everything else constant increases yield variance. Thus, there is a direct relationship between a farmer's beta and risk. For example, the pure risk premium for 75% coverage of crop insurance may increase by a factor of five as the farmer's beta increases from 0.5 to 1.5.

In step S608, a grower's beta or other indicator of a grower's risk is characterized by combining data from a farmer's yield history with prior knowledge about the distribution of betas in a geographic area. For example, the farmer's beta is characterized by combining data and prior knowledge using Bayes rules. The posterior distribution of beta is defined as $r(\beta|\hat{\beta})$. This distribution is a conditional distribution because it changes as the estimated beta changes from the regression equation. Bayes rule says that $$r(\beta|\hat{\beta}) = \frac{h(\beta|\hat{\beta})p(\beta)}{g(\hat{\beta})}$$

where $h(\beta|\hat{\beta})$ is the likelihood of observing a particular $\beta$ given that the data generated a given $\hat{\beta}$, $p(\beta)$ captures our prior beliefs about the likelihood of observing a particular $\beta$, and $g(\hat{\beta})$ is the density function of $\hat{\beta}$. The keys to implementing Bayes rules is to obtain estimates of $h(\beta|\hat{\beta})$ and $p(\beta)$. For our purposes, we assume that $h(\beta|\hat{\beta})$ follows a normal distribution with mean of $\hat{\beta}$ and a standard deviation equal to the standard error of $\hat{\beta}$ from the regression function. Our prior knowledge of the distribution of $\beta$ follows a normal distribution with a mean equal to one and a standard deviation equal to 0.5. This says that 95% of farmer's beta fall between 0 and 2. The impact of using Bayes rules to combine prior knowledge and data is show in FIG. 3. As shown, when the variance of $\hat{\beta}$ is large, then more weight is given to prior knowledge and the expected value of $\beta$ taken with respect to the posterior distribution tends towards one. As precision increases, then the expected value of $\beta$ tends towards $\hat{\beta}$. The effect of using Bayes' estimate is to lower the effect of the regression-estimated beta when the standard error of the estimate is relatively high. This procedure should lessen adverse selection.

Any method or system of rating the risk of a grower or insurable unit disclosed in any embodiment of FIG. 1 through FIG. 6 may use the following inputs: crop type, county or geographic area, projected crop price, volatility of crop price, respective expected yield of a corresponding insurable unit, size of insurable unit, estimated beta of the insurable unit, and the standard error of the estimated beta or other producer supplied data. Where an enterprise includes multiple insurable units, the distance between the insurable units (e.g., fields) may provide an additional input. The method and system disclosed hereunder are well-suited for analysis of large enterprises. Large growing units or enterprise units may be divided into separate highly correlated units (e.g., insured or insurable units) for purposes of evaluation. Further, premiums or insurance fees for growers may be calculated for yield insurance, revenue assurance, and revenue assurance with the harvest price option, such as GRP, GRIP, and GRIP-HRO based on the risk ratings of insurable units or enterprise units determined under any method or embodiment disclosed hereunder.

Group Risk Protection (GRP) is generally similar to the MPCI (Multiple Peril Crop Insurance) program, except that the county yield or geographic region yield is used, instead of the individual grower's historic yield. GRP is a risk management tool that is an alternative to the MPCI or other crop insurance based on Actual Production history. The GRP may be used by growers with yields that tend to track the county yield and where a drought or other natural disaster tends to affect a substantial portion of a county. GRP indemnifies or pays out the insured grower if the county average per acre yield (referred to as the "payment yield") falls below the insured grower's trigger yield. The Federal Crop Insurance Corporation (FCIC) may publish or disclose the payment yield to insurance providers for each county, following each growing season or crop year, or otherwise. The trigger yield means the expected county yield listed in the actuarial document multiplied by the coverage level percent listed on the accepted application. The expected county yield may represent an average of annual NASS county yields adjusted for yield trends. The grower may select a coverage level of from approximately sixty percent to approximately one hundred percent (or a lesser applicable maximum percentage) of the maximum protection per acre. Unless allowed by the GRP policy, the insured grower cannot insure the same crop through both an MPCI policy and GRP policy. A grower is not required to maintain or report yield history for GRP policies. For a GRP policy, a grower may have a low yield on his farm and not receive a payment under the GRP policy because the policy is based on county yields, not individual grower yields.

A Group Risk Income Protection (GRIP) policy is similar to a GRP policy, except the GRIP protects against general loss of revenue in a geographic area (e.g., county), as opposed to general yield shortfall in the geographic area. For example, under a GRIP policy the insured grower may receive a payment from the insurer where the county revenue falls below the insured grower's trigger revenue for the county. For GRIP, under current practices the expected market price is generally set each year or growing season by the U.S.D.A. Risk Management Agency (RMA).

GRIP-HRO refers to Group Risk Income Protection with Harvest Revenue Option; and provides some degree of group risk revenue protection based upon grower in a geographic area (e.g., county).

Figure 7:
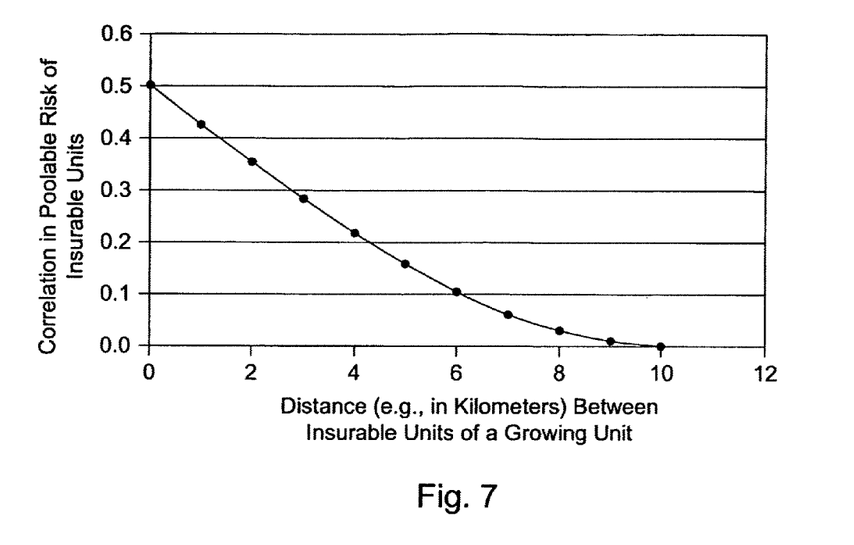
FIG. 7 is a chart that shows a reduction of risk or correlation between poolable risks with increased separation of spatially distributed fields of a grower or business entity.

FIG. 7 is a graph of correlation between poolable risks of insurable units and distance between insurable units. An insurable unit may be defined as an identifiable field or growing area for growing a crop. An insurable unit may be identified by a field identifier, an assigned enterprise identifier, an owner identifier, a lessee identifier, a geographic descriptor, a boundary point coordinates, a boundary descriptor, or the like. The vertical axis indicates correlation between poolable risks, whereas the horizontal axis indicates distance or separation (e.g., in Kilometers) between insurable units (e.g., identifiable fields) that are geographically dispersed. The graph of FIG. 7 indicates that insurable units (e.g., identifiable fields) that are separated by a lesser distance have greater correlation between poolable risks than insurable units (e.g., identifiable fields) that are separated by a greater distance. FIG. 7 shows the correlation that we have implemented in the proto-type rating software. The maximum correlation is 0.5. Correlation falls almost linearly until it reaches zero at 10 kilometers.

Having described various preferred embodiments, it will become apparent that various modifications can be made without departing from the scope of the invention as defined in the accompanying claims.

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The following is claimed:

1. A method of evaluating the risk of insuring a grower via a data processing system, the method comprising:
    obtaining, by a communications interface of the data processing system, a geographic area yield comprising, or derivable into, a mean geographic area yield of a crop for a particular geographic area for a corresponding time period;
    obtaining, by the data processing system, a benchmark grower yield for a particular grower within the particular geographic area by a yield monitor or yield sensor associated with a work vehicle for harvesting the crop;
    determining, by an analyzer of the data processing system, a difference between the mean geographic area yield and the benchmark grower yield;
    estimating, by an estimator of the data processing system, a variability parameter indicative of a variation in grower yield in the geographic area;
    determining, by the data processing system, a forecasted grower yield, which deviates from at least one of the mean geographic area yield and the benchmark grower yield for the corresponding time period, based on the difference and the variability parameter, where a first result, of a county yield less the mean geographic area yield, is multiplied by the variability parameter to determine a second result that is added to the difference to determine the forecasted grower yield; and
    determining a risk indicator with reference to the forecasted grower yield, wherein the risk indicator is estimated from the following equation:

$$\hat{\epsilon}_{ict} = y_{ict} - \hat{\alpha}_{ic} - \hat{\beta}_{ic} y_{ct}$$

where $\hat{\epsilon}_{it}$ is a risk indicator, $\hat{\alpha}_{ic} = \hat{\delta}_{ic} + (1-\hat{\beta}_{ic})\hat{\mu}_{ic} y_{ct}$ is the variability of a field i within geographic area c, $\mu_c$ is the average or mean geographic area yield, $\delta_{ic}$ is the difference between the mean geographic area yield and grower mean yield, and $y_{ct}$ is the county yield in time period t.

2. The method according to claim 1 wherein the benchmark grower yield is based on a historic yield for the particular grower or farm.

3. The method according to claim 1 wherein the benchmark grower yield is based on the historic yield for the particular grower or farm, and is adjusted for expected yield trends.

4. The method according to claim 1 wherein the geographic area yield comprises a mean county yield.

5. The method according to claim 1 wherein the forecasted grower yield is determined in accordance with the following equation:

$$y_{ict} = \mu_c + \delta_{ic} + \beta_{ic}(y_{ct} - \mu_c) + \epsilon_{ict} = \alpha_{ic} + \beta_{ic} y_{ct} + \epsilon_{ict}$$

where $y_{ict}$ is the estimated grower yield for a particular grower in a geographic area for region c and field i, $\mu_c$ is the average or mean geographic area yield, $\delta_{ic}$ is the difference between the mean geographic area yield and grower mean yield, $\gamma_{ct}$ is the county yield in time period t, and $\epsilon_{ict}$ is the error term for field i deviation in geographic area c, time period t, $\alpha_{ic} = \delta_{ic} + (1-\beta_{ic})\mu_c$, and $\beta_{ic}$ is the variability parameter or beta.

6. The method according to claim 1 wherein the risk indicator is estimated by applying the following equation:

$$\hat{\sigma}_{\epsilon,c}^2 = \frac{1}{\sum_{j=1}^{N_c} T_j} \sum_{j=1}^{N_c} \sum_{t=1}^{T_j} \hat{\epsilon}_{jct}^2$$

where $\hat{\epsilon}_{\epsilon,c}^2$, is the variance of poolable risk or collective risk for all of the insurable units with a particular geographic area, where $T_j$ is the number of years of observations for a particular grower or insurable unit j, and where $\hat{\epsilon}_{jct}^2$ is an indicator of the risk for the particular insurable unit j, in geographic area c, and at time t.

7. The method according to claim 1 wherein the determining of forecasted grower yield is based on the determined difference, the variability parameter, and a risk adjustment factor based on spatial separation of grower fields that contribute to the forecasted grower yield.

8. The method according to claim 1 wherein the determining of the forecasted grower yield comprises determining a forecasted collective yield for a geographic region based on at least one of the geographic area yield and the benchmark grower yield.

9. The method according to claim 8 further comprising determining the amount of systematic risk for growing crops in a corresponding geographic area based on the forecasted collective yield.

10. A data processing system that evaluates the risk of insuring a grower based at least partially on a benchmark grower yield for a particular grower within the particular geographic area, where the benchmark grower yield is received from a yield sensor, mounted on a work vehicle to harvest a crop, that communicates over a communications network to the data processing system, the data processing system comprising:
- a communications interface, which supports communications over the communications network, that obtains the benchmark grower yield and a geographic area yield comprising, or derivable into, a mean geographic area yield of a crop for a particular geographic area for a corresponding time period;
- a data processor, an analyzer and an estimator comprising interactive components in the data processing system arranged to process data among the benchmark grower yield and the geographic area yield obtained by the communications interface;
- the analyzer that determines a difference between the mean geographic area yield and the benchmark grower yield;
- the estimator that estimates a variability parameter indicative of a variation in grower yield or the benchmark grower yield in the geographic area; and
- the data processor that determines forecasted grower yield, which deviates from at least one of the mean geographic area yield and the benchmark grower yield for the corresponding time period, based on the difference and the variability parameter, where a first result, of a county yield less the mean geographic area yield, is multiplied by the variability parameter to determine a second result that is added to the difference to determine the forecasted grower yield; where the data processor determines a risk indicator with reference to the forecasted grower yield, wherein the risk indicator is estimated from the following equation:

$$\hat{\epsilon}_{ict} = y_{ict} - \hat{\alpha}_{ic} - \hat{\beta}_{ic} y_{ct}$$

where $\hat{\epsilon}$ is a risk indicator, $\hat{\alpha}_{ic} = \hat{\delta}_{ic} + (1-\hat{\beta}_{ic})\mu_c$, $\hat{\beta}_{ic}$ is the variability of a field i within geographic area c, $\mu_c$ is the average or mean geographic area yield, $\delta_{ic}$ is the difference between the mean geographic area yield and grower mean yield and $y_{ct}$ is the county yield in time period t.

11. The system according to claim 10 wherein the benchmark grower yield is based on a historic yield for the particular grower or farm.

12. The system according to claim 10 wherein the data processor determines the benchmark grower yield based on the historic yield for the particular grower or farm, and is adjusted for expected yield trends.

13. The system according to claim 10 wherein the geographic area yield comprises a mean county yield.

14. The system according to claim 10 wherein the data processor determines the forecasted grower yield based on the determined difference, the variability parameter, and a risk adjustment factor based on spatial separation of grower fields that contribute to the forecasted grower yield.

15. The system according to claim 10 wherein the data processor determines the forecasted collective yield, as the forecasted grower yield, for a geographic region based on at least one of the geographic area yield and the benchmark grower yield.

16. The system according to claim 15 further comprising a data processor that determines the amount of systematic risk for growing crops in a corresponding geographic area based on the forecasted collective yield.

\* \* \* \* \*